United States Patent

MacGovern

[11] 3,877,801
[45] Apr. 15, 1975

[54] IMAGE TRANSLATION APPARATUS
[75] Inventor: Alan J. MacGovern, Acton, Mass.
[73] Assignee: Itek Corporation, Lexington, Mass.
[22] Filed: Dec. 20, 1973
[21] Appl. No.: 426,992

[52] U.S. Cl. .................. 353/38; 353/94; 353/122
[51] Int. Cl. ............................................ G03b 21/14
[58] Field of Search ...................... 353/38, 30–37, 353/66, 94, 122

[56] References Cited
UNITED STATES PATENTS

| | | | |
|---|---|---|---|
| 3,222,986 | 12/1965 | Altman | 353/66 |
| 3,331,277 | 7/1967 | Wehde | 353/38 |
| 3,332,318 | 7/1967 | Gessel | 353/38 |
| 3,561,859 | 2/1971 | Heckscher | 353/30 |
| 3,674,350 | 7/1972 | Staiger | 353/94 |
| 3,712,724 | 1/1973 | Courtney-Pratt | 353/30 |

Primary Examiner—Richard E. Aegerter
Assistant Examiner—A. J. Mirabito
Attorney, Agent, or Firm—Homer O. Blair; Robert L. Nathans; Gerald H. Glanzman

[57] ABSTRACT

Image translation apparatus for projecting the image of an object to any one of a large number of possible imaging positions. The apparatus comprises a two-dimensional array of light sources and a corresponding two-dimensional array of lenses positioned conjugate to one another via a relay lens. The object is positioned adjacent the relay lens. Selective actuation of one of the light sources in the light source array will illuminate the object and the light therefrom will be brought to a focus adjacent the particular lens in the lens array that is conjugate to the selected light source. That lens will, in turn, project the image to a precise location on an image plane. The system requires no moving parts, has a fast response time, and can translate images accurately and in very small increments. Accordingly, the system is especially suitable for use in conjunction with parallel optical digital processing systems although it will also find use in a variety of other imaging applications.

10 Claims, 2 Drawing Figures

PATENTED APR 15 1975    3,877,801

IMAGE TRANSLATION APPARATUS

BACKGROUND OF THE INVENTION

1. Field of the Invention

The present invention relates generally to an optical image translation apparatus. More particularly, the present invention relates to an apparatus for selectively projecting the image of an object to any one of a large number of possible imaging positions.

2. Description of the Prior Art

In U.S. patent application Ser. No. 415,584 to Peter Nisenson filed on Nov. 14, 1973, and entitled PARALLEL DIGITAL DATA PROCESSING SYSTEM, a parallel optical digital processing system is described wherein digital data is directed through an optical circuit and subjected to the standard logical manipulations of ANDing, ORing, shifting and inverting so as to enable the subject matter represented by the digital data to be processed in a desired manner. In the system, the digital data is transmitted through the circuit in the form of optical images consisting of two-dimensional arrays of light and dark areas representing binary ones and zeros, respectively, and, to be highly effective, it is necessary that the system be able to not only process the data rapidly but also to handle large amounts of data simultaneously. Accordingly, high resolution images containing, for example, $10^2$ to $10^6$ separate bits of image data are employed. When manipulating images such as these, however, precise equipment is needed. This is especially true with respect to the structure for shifting the images laterally relative to one another by very small amounts (e.g. by one data bit, so as to enable adjacent bits of data to be added or otherwise combined for reasons well understood by those in the data processing field).

In the prior art, image shifting structures for performing these types of shifting operations usually employ moving mirrors or some equivalent form of mechanical system. Such systems, have not proven to be fully satisfactory for several reasons. For one thing, since they are basically mechanical in nature, their speed of response is quite slow and, as a result, they slow down the over-all operation of the processing system with which they are associated. Furthermore, the size of the mirrors used, in part, determines the amount of information that can be passed and, as a result, for processing large high resolution images, fairly large sized mirrors are needed. Also, to obtain very precise shifting, some form of feedback system must generally be provided which tends to make the apparatus somewhat complex and expensive. Solid state devices such as acousto-optic deflectors are not useful for image shifting as they only accept incident light over a limited angle satisfying the Bragg condition.

SUMMARY OF THE PREFERRED EMBODIMENT OF THE INVENTION

In accordance with the present invention, the above inadequacies of the prior art have been obviated by providing a system capable of laterally translating images to any one of a large number of possible imaging positions very rapidly and very accurately. In accordance with a presently preferred embodiment, the translating apparatus comprises an optical system including a first two-dimensional array of light sources and a second two-dimensional array of lenses oriented such that the lens array is positioned conjugate to the light source array via a relay lens. The object whose image is to be translated is positioned adjacent the relay lens to be selectively illuminated by one or more of the light sources in the light source array. When a particular light source is actuated it will illuminate the object and the light therefrom will be brought to a focus at the particular lens in the lens array that is conjugate to the selected light source. That particular lens will then image the object onto a display screen or other medium at a precise position corresponding to the selected light path. By providing large matrices of light sources and lenses, the image can be precisely translated up, down or sideways to any one of a large number of positions on the display screen.

Inasmuch as the above-described system does not require any moving parts, it can be operated very rapidly. Also, once the system has been properly aligned and adjusted, it will remain in position to ensure that a high degree of accuracy can be maintained for long periods. Furthermore, the system uses standard, readily available and reasonably inexpensive components making it suitable for a wide variety of applications in which image shifting is required. Yet further features of the invention will be set forth hereinafter.

DETAILED DESCRIPTION OF THE DRAWINGS

Figure 1:
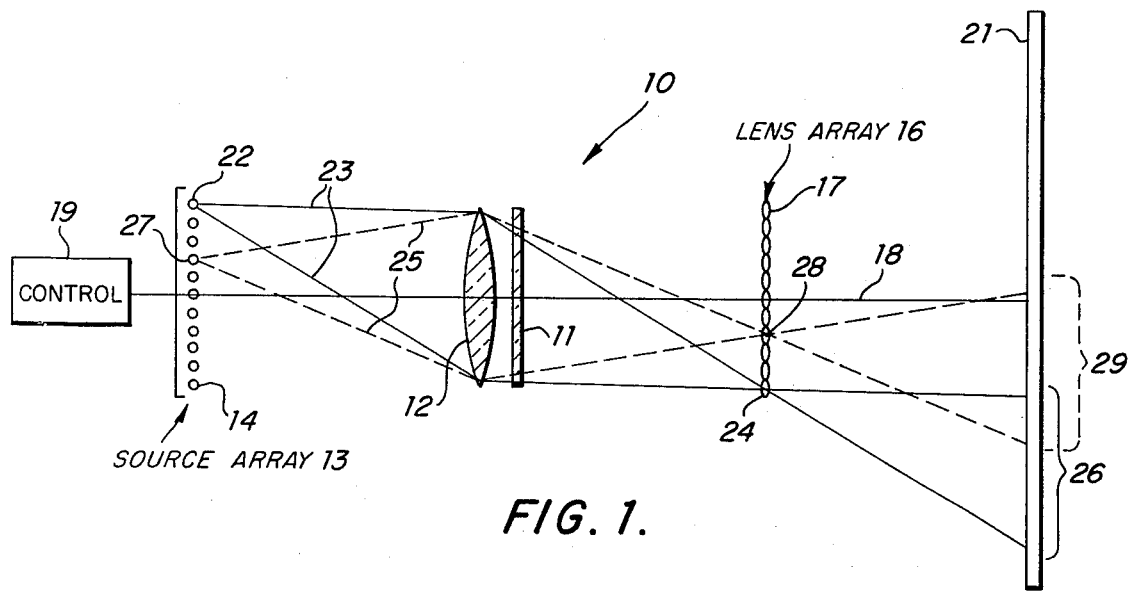

FIG. 1 schematically illustrates an image translation apparatus in accordance with the present invention for translating the image of a transparent object.

Figure 2:
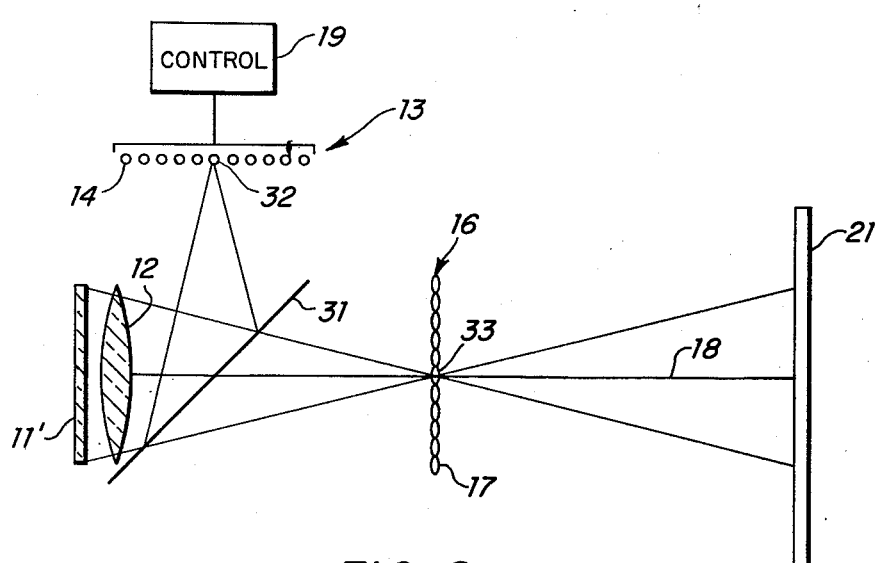

FIG. 2 illustrates a modification of the system of FIG. 1 for use with reflective objects.

DETAILED DESCRIPTION OF THE PREFERRED EMBODIMENTS

FIG. 1 schematically illustrates an optical system 10 for translating images wherein the object whose image is to be translated is transparent. The object is illustrated at 11 and in this embodiment will generally comprise a photographic transparency or the like having an array of light and dark areas or other information stored thereon. Appropriate structure (not shown) is provided to support the transparency in the proper position within the system. Positioned near the transparency 11 is a relay lens 12 of generally conventional type. Also included in the system is a two-dimensional array of light sources 13 made up of a large number of individual light sources 14 and a corresponding two-dimensional array of lenses 16 made up of a large plurality of individual lenses 17. In the preferred embodiment, for example, the light source array 13 will consist of an array of perhaps 64×64 sources, each of which are very small and approximate the properties of a point source of illumination. The sources are preferably positioned perpendicular to and symmetrical about the optical axis 18 of the relay lens 12.

The lens array 16 preferably consists of an array of individual lenses 17 that is the same in number as the light sources and will also be positioned perpendicular to and symmetrical around the axis 18 of relay lens 12. Furthermore, the light source array is positioned conjugate to the lens array via the lens 12.

Also included in the system are an appropriate control 19 to permit selective actuation of one or more of the light sources 14 in the source array as well as a suitable imaging medium schematically illustrated at 21 upon which the images are to be formed.

Operation of the system is as follows. A particular light source, e.g. 22, is actuated to illuminate the relay lens 12 as shown by the solid line bundle of rays 23. This light is collected by relay lens 12 and, after passing through the transparency 11, is brought to a focus adjacent the lens 24 which is positioned conjugate to the selected light source 22. The light then passes through lens 24 and is projected onto imaging medium 21 at the position illustrated by numeral 26.

Alternatively, if instead of illuminating light source 22, light source 27 is illuminated the light will follow a somewhat different path. In this situation, the light (shown as dotted line bundle of rays 25) after being collected by relay lens 12 and after passing through transparency 11 will be brought to a focus at the lens 28 which is conjugate to the selected light source 27. This lens will, in turn, project the image of transparency onto medium 21 at the new position indicated by numeral 29. By actuating yet other sources, the image of the transparency can be projected to any one of 64×64 different positions on display medium 21 corresponding to the number of sources and lenses provided. Also, by carefully positioning and spacing the light sources and lenses relative to one another, translation can be made very precise and accurate.

In the preferred embodiment, the light source array and the lens array are positioned a distance of twice the focal length from the relay lens 12. This will provide a real and inverted image at the lens array 16 that is the same size as the individual sources 14. Furthermore, by designing the individual lenses 17 to have the same focal length as the relay lens 12, and positioning the display medium 21 also a distance of 2 times the focal length from the lens array, the image formed on medium 21 will be the same size as the object 11. Obviously, however, these parameters could be varied as desired for particular applications.

FIG. 2 illustrates an alternative embodiment for use in applications wherein the object to be imaged is reflective rather than transparent. In FIG. 2, like reference numbers will be employed to denote similar elements as FIG. 1. FIG. 2 is similar to FIG. 1 except that the reflective object denoted 11′, is positioned behind the relay lens 12. Furthermore, the light source array 13 is positioned, as shown, to be directed to the reflective object by means of a beam splitter 31. In operation of the system of FIG. 2, when a particular light source in the light source array, e.g. 32, is illuminated it will be directed by means of beam splitter 31 through the relay lens onto the reflective object 11′. The light will then be reflected off of object 11′, returned through the relay lens 12, pass through the beam splitter 31 and be brought to a focus at the lens 33 in lens array 16 that is conjugate to the selected light source 32. From there the image will be projected onto the image plane as in FIG. 1. As illustrated in FIG. 2, by illuminating the source that is positioned on optical axis 18, the image of the object can be projected onto plane 21 without lateral translation.

In the embodiments of FIGS. 1 and 2, the light sources are preferably light emitting diodes which are individually electrically addressable through control system 19. Addressing of the individual diodes may be accomplished by providing individual wires coupling each diode to control system 19, or, more preferably, by conventional matrix addressing techniques known in the art. Light emitting diodes are preferred because they are extremely small and adequately approximate ideal point sources. Obviously a variety of other illuminating techniques or systems may also be used. For example, rather than having a large array of individual light sources, an electron beam could be scanned across a CRT screen and turned on at the appropriate time to create a properly positioned point of light. The lens arrays 16 are preferably matrices of very small plastic lenses simultaneously molded together as a unit. Such lens arrays are available in the marketplace and can be readily obtained. In an operative embodiment for a data processing system, relay lens 12 is a lens of approximately two inches in diameter while the light source array and lens arrays are matrices 2×2 inches in area made of 64×64 light sources and lenses, respectively.

As mentioned previously, an important application of the image translation system of the present invention is in conjunction with parallel optical digital processing systems. In such applications, the transparent or reflective objects 11 or 11′, respectively, would generally consist of an array of digital data in the form of a matrix of light and dark areas or in the form of electric fields stored within an electro-optic storage medium to be optically read out. By designing the light source and lens array such that the difference between two adjacent light sources will shift the image on screen 21 by a distance equal to one bit of information on the object 11, standard image processing operations can be performed. For example, one might first illuminate the light source on the optical axis 18 of the relay lens 12 to project an image of object 11 onto medium 21 in non-translated position. Thereafter, one may illuminate the light source directly below the original light source of FIG. 1 to re-illuminate the same object and to form it on the screen transposed upwardly one bit of data. In this way, two adjacent lines of data on object 11 can be superimposed upon the other to enable an addition or multiplication type of operation to be readily performed. If imaging medium 21 has storage capabilities, it further becomes possible to superimpose images of different arrays one upon the other to permit other types of data manipulations to be carried out. Many of these types of operations are set out in greater detail in the previously mentioned U.S. patent application Ser. No. 415,584, filed on Nov. 14, 1973 to Peter Nisenson, entitled PARALLEL DIGITAL DATA PROCESSING SYSTEM and does not form part of the present invention.

The present invention should not be limited to the above application, however, It also has many other applications. For example, object 11 might contain an array of alphanumeric characters, and the present invention can be used to arrange the alphanumeric characters in any desired manner for projection onto medium 21. By additionally employing suitable masking structure in the system, this can therefore be used as a phototypesetting apparatus.

In general, the present invention provides a highly efficient system for rapidly translating images to any one of a large number of desired positions. The system does not require moving parts and therefore once adjusted, will not go out of alignment. This system being solid state, also has an extremely fast response time and therefore, can be used in computer-type operations without slowing down the system. Although several embodiments have been described above, it should be recognized that the invention can take many other forms and accordingly the invention should be limited only as required by the scope of the following claims.

What is claimed is:

1. Image translation apparatus for projecting the image of an object to any one of a plurality of possible imaging positions comprising:
   a. an object to be imaged;
   b. means for illuminating said object, said object illuminating means including means for defining a plurality of illuminating positions from which said object may be illuminated;
   c. means for defining a plurality of lens positions, said plurality of lens positions being positioned conjugate to said plurality of illuminating positions via a relay lens;
   d. control means for selectively illuminating said object from one of said plurality of illuminating positions for presenting a focused image of said object to the lens position that is conjugate to said selected illuminating position; and,
   e. lens means located at said conjugate lens position for projecting said image of said object onto an image receiving medium at a position determined by the illuminating position from which said object is illuminated.

2. Apparatus as recited in claim 1 wherein said means for defining a plurality of illuminating positions comprises a plurality of light sources and wherein said means for defining a plurality of lens positions comprises a plurality of lenses.

3. Apparatus as recited in claim 1 wherein said means for defining a plurality of illuminating positions comprises means for defining a two-dimensional array of illuminating positions and wherein said means for defining a plurality of lens positions comprises means for defining a two-dimensional array of lens positions.

4. Apparatus as recited in claim 3 wherein said means for defining a two-dimensional array of illuminating positions comprises a two-dimensional array of light sources and wherein said means for defining a two-dimensional array of lens positions comprises a two-dimensional array of lenses.

5. Apparatus as recited in claim 4 wherein said array of light sources comprises an array of light emitting diodes, and wherein said control means includes means for selectively actuating said light emitting diodes.

6. Apparatus as recited in claim 3 wherein said object is light transmissive.

7. Apparatus as recited in claim 3 wherein said object is light reflective, and wherein said apparatus further includes beam splitter means positioned between said illuminating means and said object for illuminating said object through said relay lens.

8. Apparatus as recited in claim 3 wherein said object, said array of illuminating positions and said array of lens positions are all positioned along the optical axis of said relay lens, and wherein said image on said image receiving medium is laterally displaced relative to said optical axis as a function of said selected illuminating position.

9. Apparatus as recited in claim 8 wherein said array of illuminating positions and said array of lens positions are spaced from said relay lens a distance of twice the focal length of said relay lens for providing a real and inverted image of said object on said image receiving medium.

10. Apparatus as recited in claim 9 wherein said lens means has a focal length equal to said relay lens and wherein said image receiving medium is spaced from said array of lens positions a distance of twice the focal length of said lens means for providing an image on said image receiving medium that is the same size as said object.

* * * * *